Figure 1:
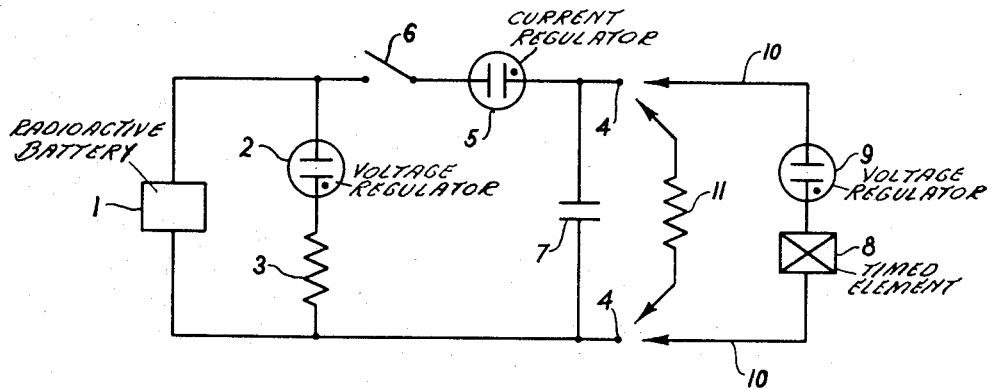

INVENTOR.
STANLEY WALLACK

United States Patent Office 2,954,516
Patented Sept. 27, 1960

2,954,516
POWER SUPPLY

Stanley Wallack, Jackson Heights, N.Y., assignor to Leesona Corporation, a corporation of Massachusetts Filed Apr. 5, 1956, Ser. No. 576,472

2 Claims. (Cl. 323—23)

This invention relates to electrical power supplies, and in particular to power supplies incorporating radioactive batteries as the source of electrical energy.

Within recent years, batteries employing radioactive elements for developing relatively high voltages at low current values have been introduced to the art. These batteries offer several advantages in operational characteristics which establish them as highly satisfactory potential sources in certain electronic and electrical applications. For example, radioactive batteries have a shelf life of the order of 25 years, do not contain any moving parts, are independent of ambient conditions, and can be economically fabricated in miniaturized form. Moreover, the quantities of radioactive materials required for operation are small and do not constitute a health hazard, and are also readily available as by-products of pile operation.

In view of the fact that the electrical characteristics of these batteries are in many aspects unique and not directly comparable to other types of electrical generators in the art, appropriate circuit design for a particular application must necessarily be adapted to the characteristics of radioactive batteries. The present invention is directed to electrical power supply circuitry particularly designed with regard to the high-voltage and constant low-current characteristics of radioactive batteries. For example, these batteries are capable of developing very high voltages from 7,000 to 10,000 volts, and the substantially constant current output is of the micro-microampere order.

A first object of this invention is to provide an electrical power supply incorporating a radioactive battery and having an output voltage in a first embodiment which increases linearly with time, and an output voltage in a second embodiment which increases exponentially with time.

Another object of this invention is to provide an electrical power supply incorporating a radioactive battery and having a voltage-regulated, constant-current output.

Another object of this invention is to provide an electrical power supply incorporating a radioactive battery and generating an accurately predeterminable output waveform having a varying amplitude with respect to time and suitable for energizing electrical control devices.

Another object of this invention is to provide a power supply which may be easily and economically fabricated in miniaturized form with a self-contained energizing source.

A first preferred embodiment of this invention contemplates a power supply energized by a radioactive battery and supplying to a pair of output terminals a potential which varies linearly with respect to time. The same power supply structure is also adapted after an initial charging interval to supply a constant-current at a constant potential to a resistive type load.

This particular power supply embodiment comprises a serially-connected resistor and voltage-regulating gas tube directly shunting a radioactive battery with said gas tube being principally operative at the threshold of gaseous breakdown for the battery potential applied thereto. This structure provides a direct-current potential regulated as to amplitude in accordance with the principles disclosed in the application of Rene J. Perdreaux, Jr. and Stanley Wallack, Serial No. 495,253, filed March 16, 1955.

A serially-connected, current-regulating gas tube and a capacitor are connected across said gas tube-resistor combination. The components are so selected as to value that the current-regulating gas tube is operated within a constant-current range for potentials substantially equal to and below the regulated potential of the power supply and for the battery current output available to flow through said current-regulating gas tube.

A second preferred embodiment of the power supply herein substitutes a resistor element for the constant-current gas tube of the first embodiment, and additionally a filter capacitor is connected directly across the output terminals of the radioactive battery. This modified power supply arrangement is adapted to apply an exponentially increasing potential to the power supply output terminals, which potential is useful in activating timer circuitry, for example.

Figure 2:
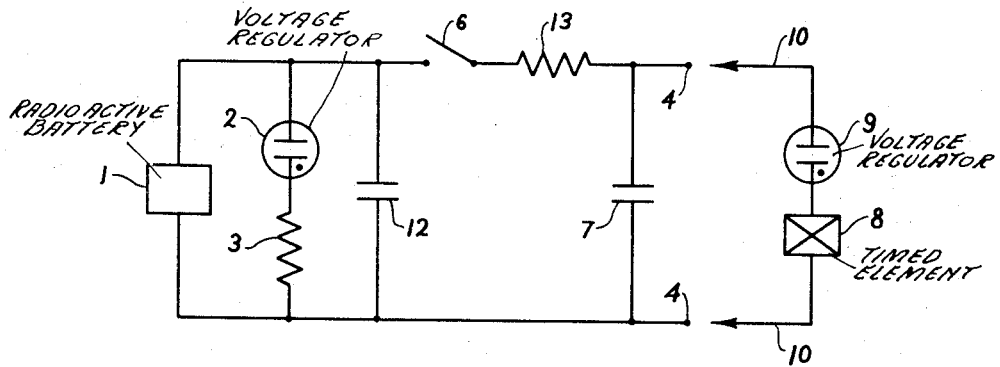

In order that all of the structural features for attaining the objects of this invention may be readily understood, reference is herein made to the accompanying drawings wherein:

Figure 1 is a schematic circuit diagram of a first embodiment of the power supply of this invention having an output potential which increases linearly with respect to time until a regulated amplitude value is attained, and thereafter supplies a constant current at this regulated potential, and Figure 2 is a schematic circuit diagram of a second embodiment of this invention having an output potential which increases exponentially with respect to time.

Referring now to Figure 1, battery 1 is a radioactive battery having a high-voltage output of the order of several thousands of volts at low current. The output potential of a radioactive battery is generated from the electrical energy associated with charged particles that are emitted by a local source of radioactive material. In general, this is accomplished by placing a collector electrode or electrodes adjacent the supply of radioactive material to collect the charged particles, thereby developing an electrical potential between the radioactive material and the collector electrode. Battery 1 may correspond in construction to the batteries disclosed in the copending application of H. C. Lieb and E. J. Dziedziula Serial No. 470,565, filed November 23, 1954, and the application of H. C. Lieb Serial No. 470,566, filed November 23, 1954. Other constructions are also disclosed in U.S. Patents 2,517,120, 2,552,050 and 2,555,143, all issued to E. G. Linder on August 1, 1950, May 8, 1951, and May 29, 1951, respectively.

The output of battery 1 is directly shunted by serially-connected gas diode 2 and resistor 3. Gas diode 2 is a voltage-regulating tube, and resistor 3 is a current-limiting resistor of the order of several megohms. Components 1 through 3 comprise a voltage-regulated power supply having an output voltage limited to an amplitude determined principally by the breakdown potential of gas diode 2. The maximum output potential of battery 1 is generally of the order of several thousands of volts, and inasmuch as this potential is substantially greater than that usually required for electronic circuitry which may be energized by the power supply, gas diode 2 and resistor 3 are connected across the output of the battery in order to limit this potential to a maximum amplitude suitable for conventional circuitry.

In particular, resistor 3 has a very high resistance value, preferably of the order of several megohms in order to prevent the firing of diode 2 and to maintain the diode at approximately the threshold of firing. As a result of the minute flow of battery current through diode 2 and resistor 3, the potential across the battery attains equilibrium at a value below the firing potential of the diode. This is, any incremental increase in potential across the battery has the effect of causing an increased flow of current through diode 2 and resistor 3 which prevents any further increase in output potential.

This voltage-regulated potential is applied to a pair of output terminals 4 through a current-regulating gas tube 5 and operate switch 6. Gas tube 5 is so selected that it will pass a constant current for all potentials in substantially the entire potential range below the regulated potential determined by gas tube 2. Gas tube 5 may, for example, be of the type sold under the tradename "Curpistor" by Chatham Electronics of Livingston, New Jersey.

Capacitor 7 shunts output terminals 4, and this capacitor is charged by current flow through gas tube 5. Inasmuch as this current flow is at a constant value for substantially the entire potential range below the regulated potential of the power supply, the constant charging current for capacitor 7 results in the application of a linearly increasing output potential to output terminals 4.

The foregoing power supply structure may be employed to energize associated circuitry by its linearly increasing output potential and/or its constant-current, constant potential output.

The linearly increasing potential of the capacitor 7 may be employed, for example, to produce the timed activation of the device 8. In this instance, device 8 is connected to output terminals 4 through gas tube 9 and conductors 10. Capacitor 7 is linearly charged by closing operate switch 6. When the breakdown potential for gas tube 9 has been attained by the linearly charging capacitor 7, the resulting current surge through gas tube 9 actuates device 8 an accurately timed interval after the closure of switch 6.

In the event that it is desired to employ the foregoing power supply structure to supply a constant current at a constant potential, a resistive load 11 is connected to output terminals 4. The power supply will supply a very low value, constant current to load 11 in the event that the resistance thereof permits gas tube 5 to operate within the constant current range of the power supply.

Figure 2 discloses a modification of the power supply of Figure 1. Components in this figure having functions which correspond to those of components shown in Figure 1 are referenced with the same numerals employed in Figure 1.

Filter capacitor 12 has been added to directly shunt battery 1, and resistor 13 has been substituted for current-regulating gas tube 5.

Capacitor 12 is initially slowly charged by battery 1 to the regulated potential determined by gas diode 2. The subsequent closure of operate switch 6 exponentially charges capacitor 7 through resistor 13. Resistor 13 preferably has a resistance value of several megohms in order to prevent appreciable loading of capacitor 12 and battery 1 thereby maintaining the characteristic exponential charging waveform. This power supply can also be employed to actuate device 8 a timed interval after the closure of switch 6.

It is to be understood that the above-described arrangements are illustrative of the applications of the principles of this invention. Numerous other arrangements may be devised by those skilled in the art without departing from the scope of this invention.

Having thus described the invention, what is claimed as new and desired to be secured by Letters Patent is:

1. An electrical power supply comprising a radioactive battery, a serially-connected resistor and voltage-regulating gas tube shunting said battery and operative at or below the threshold of gaseous breakdown for the battery potential applied thereto, and a serially-connected constant current-regulating gas tube and a capacitor shunting said serially-connected resistor and voltage-regulating gas tube, said current-regulating gas tube being operative within a constant-current range for potentials substantially equal to and below the regulated potential appearing across said serially-connected resistor and voltage-regulating gas tube and for the battery current output available to flow through said current-regulating gas tube at the regulated potential whereby said capacitor is charged at a substantially constant predetermined rate, and a pair of output terminals connected to said capacitor.

2. An electrical power supply comprising a radioactive battery, a serially-connected current-limiting impedance element and a non-linear impedance element having a transition point at which the impedance changes greatly in response to applied potential variations, said serially-connected combination shunting said battery and operative at or below the impedance transition point for the battery potential applied thereto, and a serially-connected constant current-regulating impedance element and a capacitor shunting said first serially-connected combination, said current-regulating impedance element being operative within a constant-current range for potentials substantially equal to and below the regulated potential appearing across said first serially-connected combination and for the battery current output available to flow through said current-regulating impedance element whereby said capacitor is charged at a substantially constant predetermined rate, and a pair of output terminals connected to said capacitor.

References Cited in the file of this patent
UNITED STATES PATENTS

| | | |
|---|---|---|
| 1,841,983 | Ruhlemann | Jan. 19, 1932 |
| 2,037,925 | Rentscher | Apr. 21, 1936 |
| 2,294,375 | Belar | Sept. 1, 1942 |
| 2,483,755 | Corrington | Oct. 4, 1949 |
| 2,524,325 | Mentzer | Oct. 3, 1950 |
| 2,714,692 | Nupp et al. | Aug. 2, 1955 |